United States Patent [19]

Winston

[11] Patent Number: 4,572,762
[45] Date of Patent: Feb. 25, 1986

[54] LOST FOAM PATTERN ASSEMBLY EQUIPMENT

[75] Inventor: John H. Winston, Menomonee Falls, Wis.

[73] Assignee: Outboard Marine Corporation, Waukegan, Ill.

[21] Appl. No.: 583,661

[22] Filed: Feb. 27, 1984

[51] Int. Cl.[4] ............................................. B05C 1/02
[52] U.S. Cl. .................................... 156/556; 118/243; 156/291; 156/292; 156/548; 156/580
[58] Field of Search ............... 156/578, 228, 556–563, 156/291–292, 548, 566–568, 571, 572; 118/243, 263

[56] References Cited

U.S. PATENT DOCUMENTS

| | | | |
|---|---|---|---|
| 2,006,071 | 6/1935 | Edwards | 156/572 X |
| 3,094,726 | 6/1963 | Kamborian | 118/243 X |
| 3,873,400 | 3/1975 | Tsuchida et al. | 156/578 X |
| 4,407,223 | 10/1983 | Morin et al. | 118/243 X |
| 4,443,288 | 4/1984 | Sawada et al. | 156/556 X |

Primary Examiner—David Simmons
Attorney, Agent, or Firm—Michael, Best & Friedrich

[57] ABSTRACT

A machine for assembling lost foam pattern sections. The machine has an upper retainer for holding an upper pattern section in a generally horizontal position with the surfaces to be glued facing downwardly to be contacted by a glue plate having a raised configuration depicting the glue pattern desired on the to-be-glued surfaces of the upper section. The machine provides for application of glue to the glue plate prior to moving the glue plate into contact with the upper section to transfer glue to the upper section. A lower retainer for a lower pattern section is moved into contact with the upper section long enough for the glue to set.

16 Claims, 13 Drawing Figures

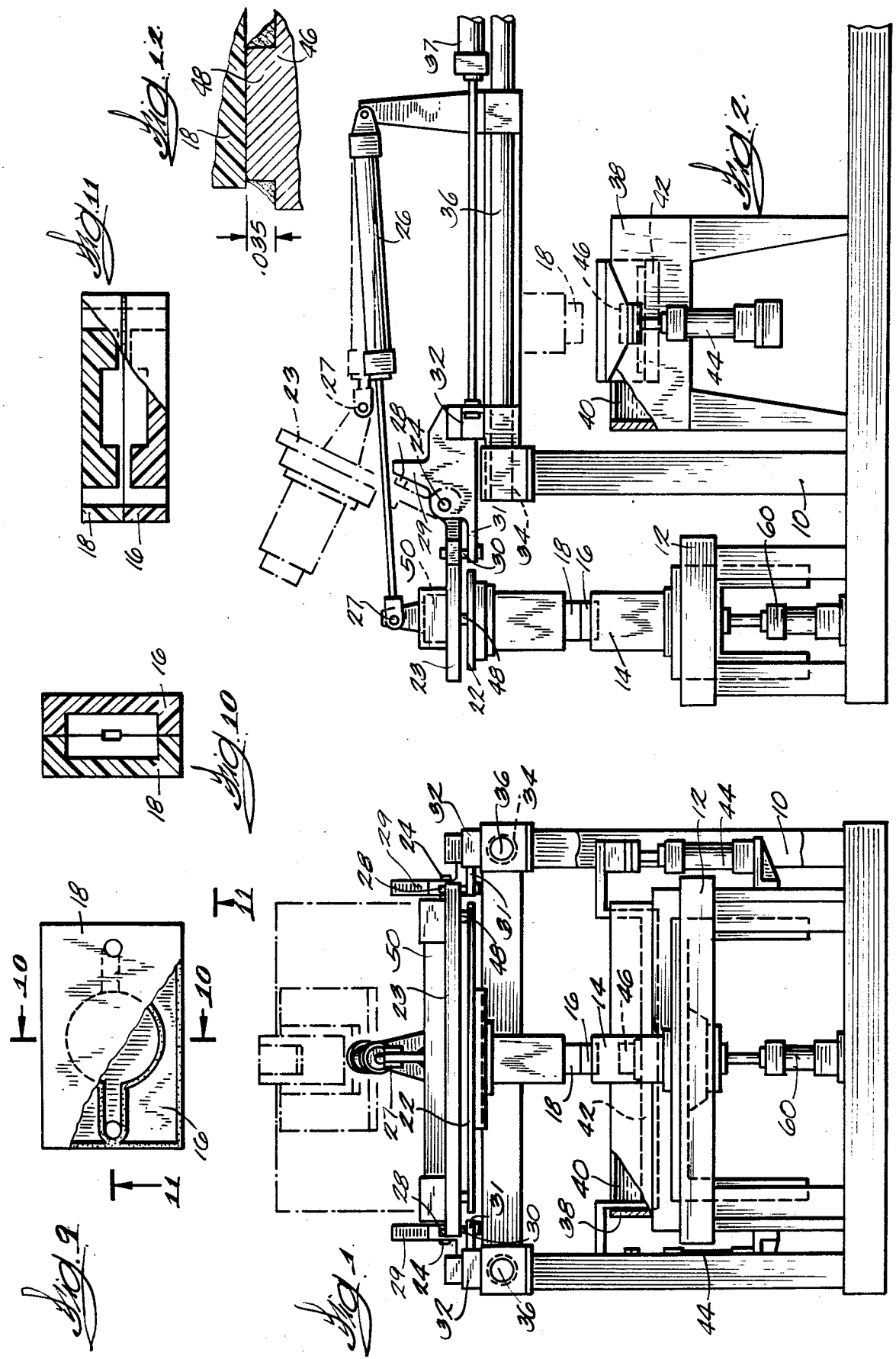

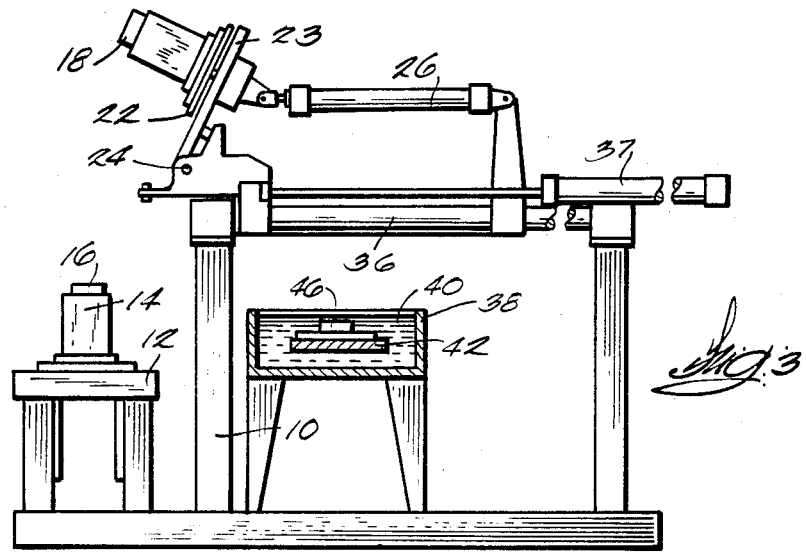
Fig. 3
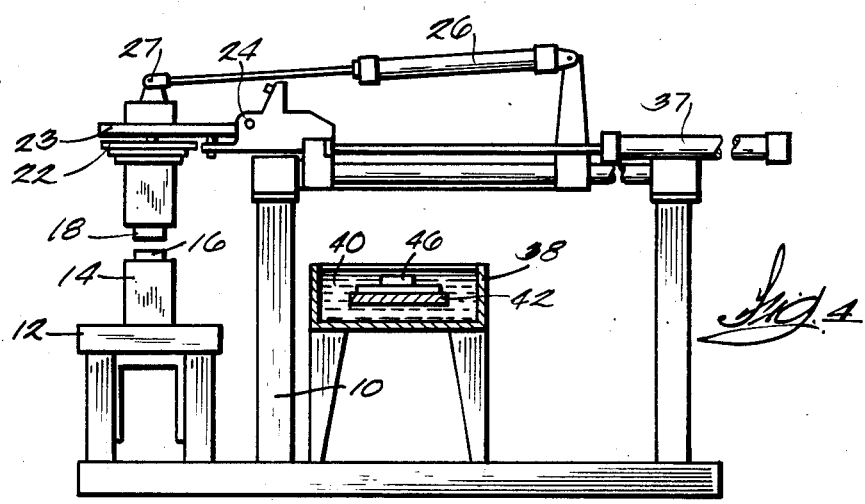
Fig. 4
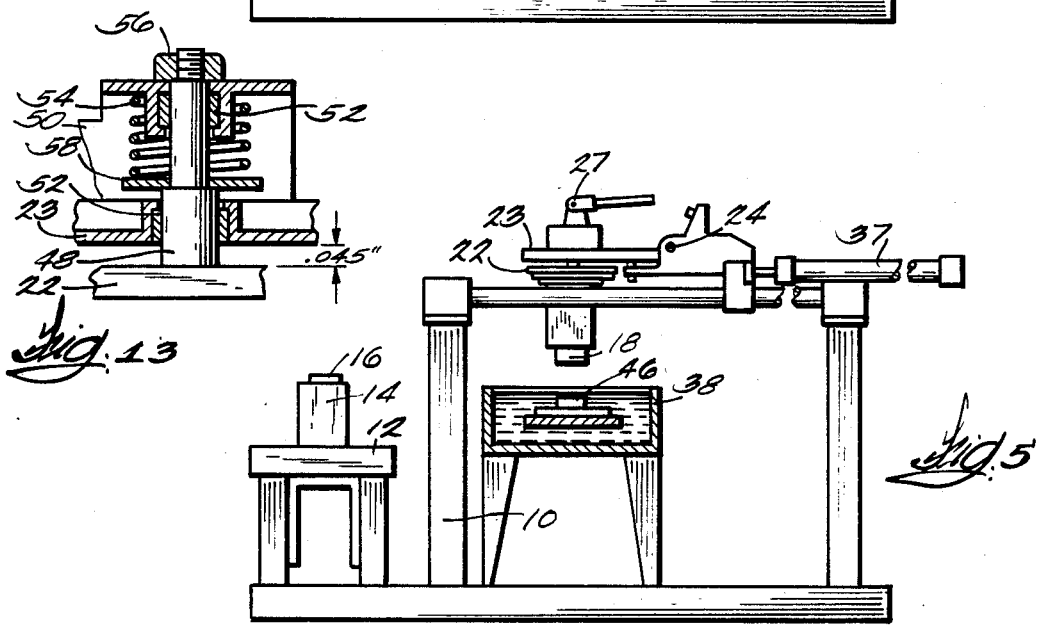
Fig. 13
Fig. 5

LOST FOAM PATTERN ASSEMBLY EQUIPMENT

FIELD OF THE INVENTION

This invention relates to machine assembly of complex lost foam patterns.

BACKGROUND OF THE INVENTION

Complex lost foam patterns require sections which are glued together. The sections must be aligned accurately to minimize machining of the finished casting. The joints must be sealed by the adhesive to prevent casting flaws.

SUMMARY OF THE INVENTION

This invention provides a machine for assembling lost foam pattern sections. The machine has an upper retainer for holding an upper pattern section in a generally horizontal position with the surfaces to be glued facing downwardly to be contacted by a glue plate having a raised configuration depicting the glue pattern desired on the to-be-glued surfaces of the upper section. The machine provides for application of glue to the glue plate prior to moving the glue plate into contact with the upper section to transfer glue to the upper section. Then the upper section is moved forward and a lower retainer for a lower pattern section is moved into contact with the upper section long enough for the glue to set.

The invention also provides for such a machine a tank containing liquid glue and means moving the glue plate into said tank to submerge said plate and apply glue thereto for subsequent transfer to the upper section.

The machine supports the upper retainer for limited vertical movement when the lower retainer moves the lower section into contact with the upper section and has means adjustably resisting vertical movement of said upper retainer. This ensures proper pressure to transfer the glue.

To ensure accuracy of the assembly the machine provides for registration of the upper retainer and section relative to the glue plate while the lower retainer and section are registered relative to said upper retainer and section. Each retainer provides back-up for the section carried thereby in vertical alignment with the glue joint. This ensures proper pressure during glue transfer and during assembly.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

In the following description reference is made to "glue" which is typically hot glue but can be any suitable adhesive or solvent (which makes solvent bonding possible).

BRIEF DESCRIPTION OF THE DRAWINGS

FIG. 1 is a somewhat schematic elevation of the machine with the upper platen in position over the lower platen, but with the platen also shown in dashed lines in the raised position.

FIG. 2 is a somewhat schematic elevation of the machine viewed from the side in FIG. 1.

FIGS. 3 through 8 are schematic side elevations showing the sequence of operation of the machine.

FIG. 9 is a plan view of a simplified pattern with parts broken away to show typical glue lines for joining the two sections of the pattern.

FIG. 10 is a section taken on line 10—10 of FIG. 9.

FIG. 11 is a section taken on the meandering line 11—11 in FIG. 9.

FIG. 12 is an enlarged detailed view to an expanded vertical scale with the glue print plate contacting a pattern and the glue squeezed from between the "land" and the pattern.

FIG. 13 is a detail of the support for the upper platen, to allow limited vertical movement against an adjustable spring load.

DETAILED DESCRIPTION OF THE DRAWINGS

Figure 6:
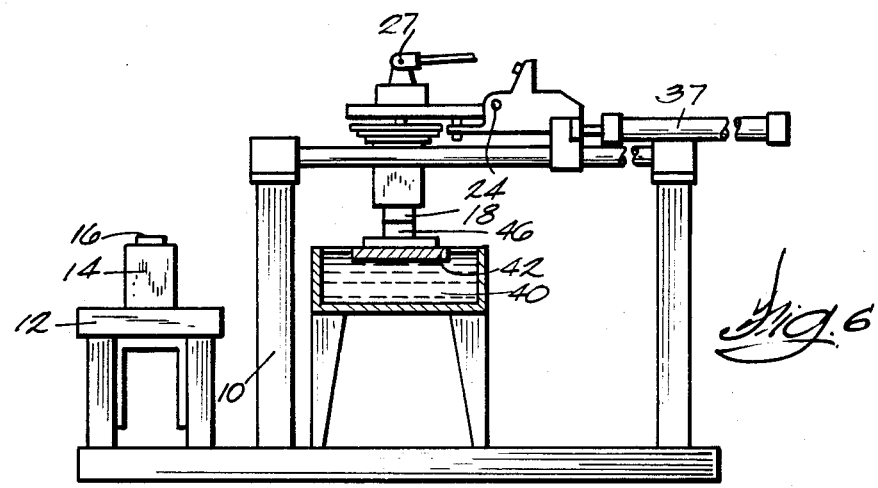

The machine has a frame 10 supporting lower platen 12 for limited vertical movement between a lower or normal position and a raised position. One or more retainers 14 are fixed on the lower platen to accurately support a lower foam pattern section 16. Any suitable method for locating the lower pattern section 16 on the retainer may be used. This can involve pins, locating walls or stops and the like. Preferably, the retainer is provided with compliant vacuum cups to seal to the foam pattern section when vacuum is applied. This will pull the pattern section against the reference surfaces, thus establishing the elevation of the lower foam section 16.

When air cylinder 60 is actuated, the platen, the retainer and the foam section will rise to move the lower section into contact with the upper foam section 18 mounted in an upper retainer carried on the upper platen 22. The upper platen 22 is supported by frame 23 pivoted on shafts 24, 24 projecting from carrier 32. The frame 23 and platen 22 move between horizontal and raised (vertical) positions respectively shown in solid and dotted lines in FIGS. 1 and 2. The vertical position facilities loading the upper foam section into the retainer 20.

The movement of the upper platen between the horizontal and vertical positions is controlled by an air cylinder 26 pivotally connected to the carrier 32 and pivotally connected to frame 23 at 27. In the raised position an adjustable stop 28 on the frame rests on arm 29. In the lower position the frame stop 30 rests against arm 31. The frame can include projecting fingers or the like operating limit switches to insure proper sequencing of the controls.

The pivot shafts 24, 24 for the frame 23 project from carrier 32 having sleeve bushings 34 slidable on guides 36 to permit the carrier (and the frame 23, the upper platen and the upper retainer and foam section carried thereby) to be moved between a forward position in which the upper foam section is above the lower foam section and a rear position (shown in dotted lines in FIG. 2) in which the upper foam section is above the tank 38 containing the hot glue 40. Air cylinder 37 moves the carrier between the forward and rear positions.

A glue platen 42 is vertically movable into and out of the hot glue 40 by means of air cylinders 44 on each side (FIG. 1) of the machine. Thus, the air cylinders 44 can be actuated to lower the platen into the hot glue or to raise the platen out of the hot glue. The platen carries what is referred to as a glue print plate 46 having a raised land 48 on its top surface in the shape of the glue pattern desired on the downwardly facing surface(s) of the upper foam section. It has been found that a hot glue of a relatively low viscosity (in the order of 200 centipoise) at about 250° F. is satisfactory. With the operating temperature limited to 250° F., distortion of the polystyrene foam pattern will be avoided. The time for the hot melt adhesive to solidify must be short to minimize the cycle time for the machine but must be adequate to provide a secure sealed joint. Pattern flaws can occur if the pattern section joints are not sealed.

Typically, the glue print land 48 is 0.035 inches above the adjacent surface of the print plate. Glue is picked up on the land when the print plate is submerged in the hot glue. When the print plate is raised by means of the air cylinders 44 lifting the glue platen glue on the land is squeezed out from between the land and the pattern and forms somewhat of a meniscus between the edge of the land and the relief area 0.035" below the land. As the platen is lowered the glue is drawn back to the "print" area almost as if by reason of a pressure differential. The amount of glue so deposited is a function of viscosity, temperature and the height of the land above the relief and the width of the relief. This requires some experimentation to achieve the desired result.

The operating sequence starts with the machine in the position shown in FIG. 3 with the upper platen raised to simplify loading the upper foam section into the upper retainer. The lower foam section is placed in the lower retainer. The remaining sequence is preferably automatic and starts after the pattern sections have been loaded into the retainers. The next step is to lower the upper platen by means of air cylinder 26 to the position shown in FIG. 4. Now the horizontal cylinder 37 is actuated to move the carrier to its rear position in which the upper foam section is over the print plate submerged in the tank as shown in FIG. 5.

It should be noted that in this position the upper foam pattern section will be precisely located relative to the glue print plate since the glue platen serves as the reference point for all registration. Thus, the upper platen is registered relative to the glue platen and the lower platen is registered relative to the upper platen.

With the upper platen accurately registered relative to the glue platen and print plate, the glue platen is raised by means of cylinders 44 to move the print plate into contact with the downwardly facing surfaces of the upper pattern section which are to receive glue (FIG. 6).

The upper platen is mounted on the frame 23 by means of upwardly projecting shafts 48 guided in bearings 52 mounted in the cross beam 50 of the frame 23. The shafts can slide vertically in bearings 52, 52 which permit some linear movement. The shafts 48 and hence the platen 22 are biased downwardly by springs 54 compressed between the adjusting nut 56 and the shoulder 58 on the shaft 48. The motion permitted is only 0.045 inches but this is enough to obtain the desired contact force when transferring glue from the print plate to the foam section. Thus, after the print plate is brought into contact with the upper foam section (FIG. 6), the print plate moves a little further to lift the weight of platen 22, the retainer(s), etc. against the compressed springs 54. The springs are adjusted to develop 15 to 25 psi on the print pattern to produce the desired glue transfer in a controllable way while avoiding damage to the foam section. It may be noted that the foam section should be solidly backed up by the retainer plate to insure development of the desired pressure.

With the correct temperature and viscosity of the glue enough glue will be picked up by the print plate to be transferred to the foam section. Only a limited quantity of glue will be transferred. Too much glue produces flaws. It may be noted that all glue surfaces of the upper pattern section need not be in the same horizontal plane. They may be in different horizontal planes with the print plate being correspondingly mated to that configuration. Indeed, it would be unusual to have all of the glue receiving surfaces in the same horizontal plane. All the planes may not be horizontal or parallel to one another.

Figure 7:
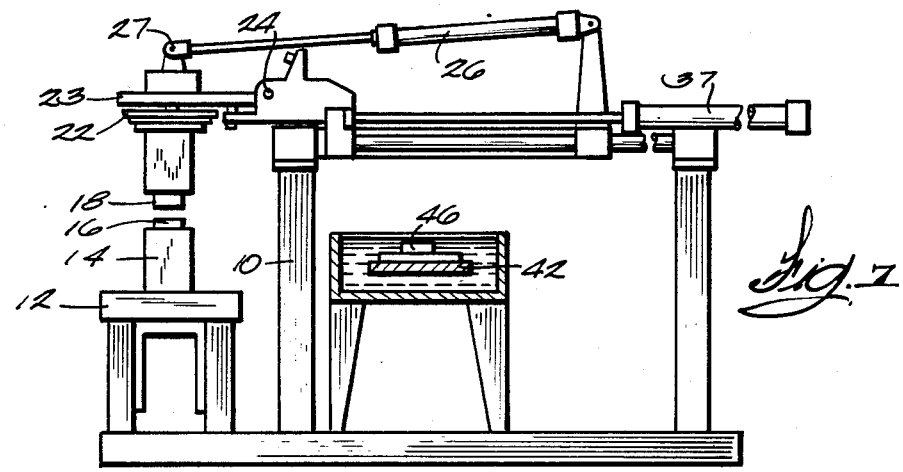
Figure 8:
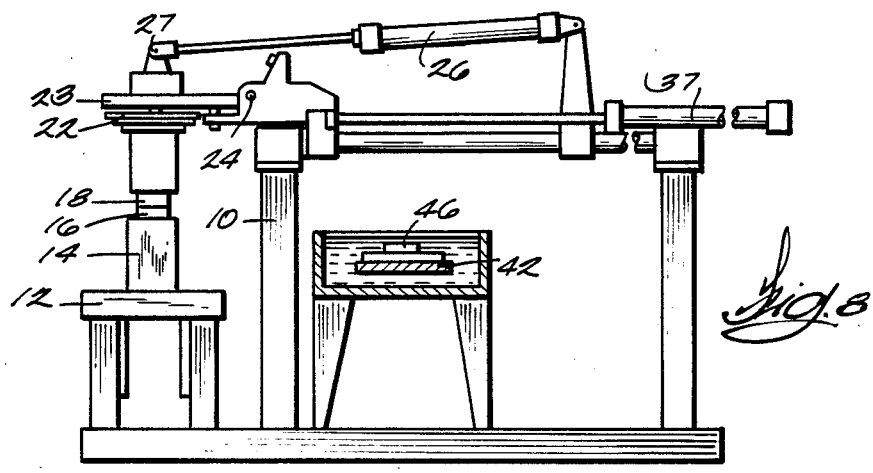

After the glue has been transferred to the upper pattern section, the print plate is lowered into the tank and cylinder 37 is actuated to move the upper platen forward over the lower platen as shown in FIG. 7. Then cylinder 60 underneath the lower platen is actuated to raise that platen and the lower retainer and lower pattern section to bring the lower pattern section into contact with the upper pattern section (FIG. 8). The parts are held in this position long enough for the glue to set and complete the assembly. The lower platen is registered relative to the upper platen. Therefore when the lower platen is raised as in FIG. 8, it will register with the upper pattern section. The upper platen is registered relative to the glue platen. Thus, all references go back to the glue platen and accuracy is insured.

After the glue has hardened, the vacuum on the upper pattern section is released to enable the upper platen to be raised to the vertical position (FIG. 3). Then the vacuum is released on the lower foam pattern section to enable removal of the now glued together upper and lower sections (i.e., the assembled pattern). This machine permits accurate assembly of hollow patterns having complex interiors. A simple hollow pattern is shown in FIGS. 9–11.

I claim:

1. A machine for assemblying foam pattern sections, said machine comprising an upper retainer for holding an upper pattern section in a horizontal position with a surface which is to be glued facing downwardly means mounting said upper retainer for rotary movement between a horizontal position and a generally vertical position, a tank for hot melt adhesive, a glue platen movable between a first position in said tank and a second position above said tank, said platen having therein a raised configuration depicting the configuration of the glue pattern desired on said upper pattern section, means for moving said upper retainer with the pattern section thereon and said platen relative to each other to move said raised configuration into contact with the upper pattern section to transfer adhesive to the upper pattern section, a lower retainer for holding a lower pattern section, and means for moving said upper and lower retainers relative to each other to move the lower and upper pattern sections into contact with each other for bonding therebetween.

2. A machine according to claim 1 in which said upper retainer is aligned and registered relative to said glue platen and said lower retainer is aligned and registered relative to said upper retainer.

3. A machine according to claim 2 in which each pattern section is backed up and supported by the associated retainer in vertical alignment with the glue joint.

4. A machine according to claim 3 in which said glue platen and said lower retainer are raised a given distance toward said upper retainer and said upper retainer includes means opposing said upward movement with a given force.

5. A machine according to claim 1 in which said lower retainer is positioned in front of said tank and said upper retainer is movable horizontally between a forward position above said lower retainer and a rearward position above said tank.

6. A machine for assembling lost foam pattern sections, said machine comprising an upper retainer for holding an upper pattern section in a generally horizontal position with a lower surface to be glued facing downwardly, said upper retainer being mounted for movement between a horizontal position and a generally vertical position in which the upper pattern section may be loaded onto and unloaded from said upper retainer, a glue plate having a raised configuration depicting the glue pattern desired on the surface of the upper section, means for applying glue to said glue plate, means moving said glue plate and said upper retainer relative to each other to contact said glue plate with the lower surface of the upper pattern section so as to transfer glue to the upper pattern section, a lower retainer for holding a lower pattern section, and means for moving said upper retainer and said lower retainer relative to each other so that the pattern sections carried thereby come into contact for a period long enough for the glue to set.

7. A machine according to claim 6 in which each of said retainers provides back up for the section carried thereby in vertical alignment with the glue joint.

8. A machine according to claim 6 in which said means for applying glue to said glue plate comprises a tank of liquid glue and said means for moving said glue plate is operative to move said glue plate into said tank to submerge said plate.

9. A machine according to claim 8 including means supporting said upper retainer for limited vertical movement when said lower retainer moves the lower pattern section into contact with the upper pattern section, and means adjustably resisting vertical movement of said upper retainer.

10. A machine according to claim 6 in which said upper retainer is registered relative to said glue plate and said lower retainer is registered relative to said upper retainer.

11. A machine according to claim 6 including means for moving said upper retainer horizontally between a forward position above said lower retainer and a rearward position above said glue plate, said upper retainer being in its said horizontal position during said horizontal movement.

12. A machine for assembling lost foam pattern sections, said machine comprising an upper retainer for holding an upper pattern section in a generally horizontal position with a surface to be glued facing downwardly, a glue plate with a surface having a raised configuration depicting the glue pattern desired on the lower surface of the upper pattern section, means for applying glue to said glue plate, means for moving said glue plate and said upper retainer relative to each other to contact said glue plate with the lower surface to transfer glue to the upper pattern section, a lower retainer for holding a lower pattern section, said lower retainer being located in horizontally spaced relation from said glue plate, means for moving said lower retainer and said upper retainer relative to each other so that the lower pattern section comes into contact with the upper pattern section long enough for the glue to set, and means for moving said upper retainer horizontally between a first position above said lower retainer and a second position above said glue plate and angularly relative to said first position to a generally vertical position adapted to facilitate loading and unloading of pattern sections.

13. A machine for assembling lost foam pattern sections, said machine comprising a lower retainer for holding a lower pattern section, an upper retainer for holding an upper pattern section, said upper retainer being mounted for horizontal movement between a first position above said lower retainer and a second position horizontally spaced from said first position and being mounted for rotary movement between one of said first and second positions and a generally vertical position which is angularly spaced from said one position and which is adapted to facilitate loading onto and unloading from said upper retainer, means for applying glue to a lower surface of the upper pattern section when said upper retainer is in said second position, means for horizontally moving said upper retainer between said first position and said second position, means for rotating said upper retainer between said one position and said third position, and means for moving said upper and lower retainers relative to each other when said upper retainer is in said first position to engage the pattern sections held thereby for a period long enough for the glue to set.

14. A machine for assembling lost foam pattern sections, said machine comprising a lower retainer for holding a lower pattern section, said lower retainer being mounted for vertical movement, an upper retainer for holding an upper pattern section, said upper retainer being mounted for horizontal movement between a first position above said lower retainer and a second position horizontally spaced from said first position and being mounted for rotary movement between one of said first and second positions and a generally vertical position which is angularly spaced from said one position and which is adapted to facilitate loading onto and unloading from said upper retainer, means for applying glue to a lower surface of the upper pattern section when said upper retainer is in said second position, means for horizontally moving said upper retainer between said first position and said second position, means for rotating said upper retainer between said one position and said third position, and means for vertically moving said lower retainer toward said upper retainer when said upper retainer is in said first position to engage the pattern sections held thereby for a period long enough for the glue to set.

15. A machine for assembling lost foam pattern sections, said machine comprising a lower retainer for holding a lower pattern section, an upper retainer for holding an upper pattern section, said upper retainer being mounted for horizontal movement between a first position above said lower retainer and a second position horizontally spaced from said first position and being mounted for rotary movement between one of said first and second positions and a generally vertical position which is angularly spaced from said one position and which is adapted to facilitate loading onto and unloading from said upper retainer, a tank for hot melt adhesive located below said second position, a glue platen having therein a raised configuration depicting the configuration of the glue pattern desired on said upper pattern section, said glue platen being movable vertically relative to a first position in said tank, means for vertically moving said glue platen from said first position toward said upper retainer when said retainer is in said second position so as to move said raised configuration into contact with the upper pattern section to transfer adhesive to said upper pattern section, means for horizontally moving said upper retainer between said first position and said second position, means for rotating said upper retainer between said one position and said third position, and means for moving said upper and lower retainers relative to each other when said upper retainer is in said first position to engage the pattern sections held thereby for a period long enough for the glue to set.

16. A machine for assembling lost foam pattern sections, said machine comprising a lower retainer for holding a lower pattern section, said lower retainer being mounted for vertical movement, an upper retainer for holding an upper pattern section, said upper retainer being mounted for horizontal movement between a first position above said lower retainer and a second position horizontally spaced from said first position and being mounted for rotary movement between said first position and a generally vertical position which is angularly spaced from said first position and which is adapted to facilitate loading onto and unloading from said upper retainer, a tank for hot melt adhesive located below said second position, a glue platen having therein a raised configuration depicting the configuration of the glue pattern desired on said upper pattern section, said glue platen being vertically movable relative to between a first position in said tank, means for vertically moving said glue platen from said first position toward said upper retainer when said retainer is in said second position so as to move said raised configuration into contact with the upper pattern section to transfer adhesive to said upper pattern section, means for horizontally moving said upper retainer between said first position and said second position, means for rotating said upper retainer between said first position and said third position, and means for vertically moving said lower retainer toward said upper retainer when said upper retainer is in said first position to engage the pattern sections held thereby for a period long enough for the glue to set.

* * * * *